United States Patent
Fujita

(10) Patent No.: US 10,397,843 B2
(45) Date of Patent: Aug. 27, 2019

(54) COMMUNICATION APPARATUS THAT WIRELESSLY COMMUNICATES WITH EXTERNAL APPARATUS, CONTROL METHOD, AND STORAGE MEDIUM

(71) Applicant: CANON KABUSHIKI KAISHA, Tokyo (JP)

(72) Inventor: Shunji Fujita, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/033,312

(22) Filed: Jul. 12, 2018

(65) Prior Publication Data

US 2019/0028945 A1  Jan. 24, 2019

(30) Foreign Application Priority Data

Jul. 20, 2017  (JP) ................. 2017-141209

(51) Int. Cl.
*H04W 36/00* (2009.01)
*H04W 36/14* (2009.01)
(Continued)

(52) U.S. Cl.
CPC .......... *H04W 36/14* (2013.01); *H04W 76/14* (2018.02); *H04W 76/15* (2018.02); *H04W 84/12* (2013.01); *H04W 88/06* (2013.01)

(58) Field of Classification Search
CPC ..... H04W 36/14; H04W 76/15; H04W 76/14; H04W 84/12; H04W 88/06
See application file for complete search history.

(56) References Cited

U.S. PATENT DOCUMENTS

| | | | |
|---|---|---|---|
| 2010/0167650 A1* | 7/2010 | Ueda | G06F 3/023 455/41.2 |
| 2015/0163724 A1* | 6/2015 | Tanabe | H04W 48/08 455/41.1 |

(Continued)

FOREIGN PATENT DOCUMENTS

| | | |
|---|---|---|
| JP | 2009-212732 A | 9/2009 |
| JP | 2011-151746 A | 8/2011 |
| JP | 2016-139917 A | 8/2016 |

OTHER PUBLICATIONS

The above foreign patent document was cited in the Mar. 11, 2019 Japanese Office Action, which is enclosed without an English Translation, that issued in Japanese Patent Application No. 2017141209.

*Primary Examiner* — Khai M Nguyen
(74) *Attorney, Agent, or Firm* — Cowan, Liebowitz & Latman, P.C.

(57) ABSTRACT

There is provided a communication apparatus. A first communication unit communicates with an external apparatus in accordance with a first communication method. A second communication unit communicates with the external apparatus in accordance with a second communication method. A determination unit determines identification information of the second communication unit based on predetermined information related to communication with the external apparatus via the first communication unit. A control unit performs control so as to establish communication with the external apparatus via the second communication unit, using the determined identification information of the second communication unit.

13 Claims, 8 Drawing Sheets

| VENDOR IDENTIFIER (24bit) | REGION MANAGED BY EACH VENDOR (24bit) |
|---|---|

(51) Int. Cl.
  *H04W 76/14*     (2018.01)
  *H04W 76/15*     (2018.01)
  *H04W 84/12*     (2009.01)
  *H04W 88/06*     (2009.01)

(56) References Cited

U.S. PATENT DOCUMENTS

2015/0312706 A1* 10/2015 Takahashi ............ H04W 48/16
                                                    455/41.2
2016/0227014 A1*  8/2016 Takagi ................ H04M 1/7253
2016/0366290 A1* 12/2016 Hoshino ............ H04N 1/00225
2018/0310153 A1* 10/2018 Sueyoshi ................ H04B 5/02

* cited by examiner

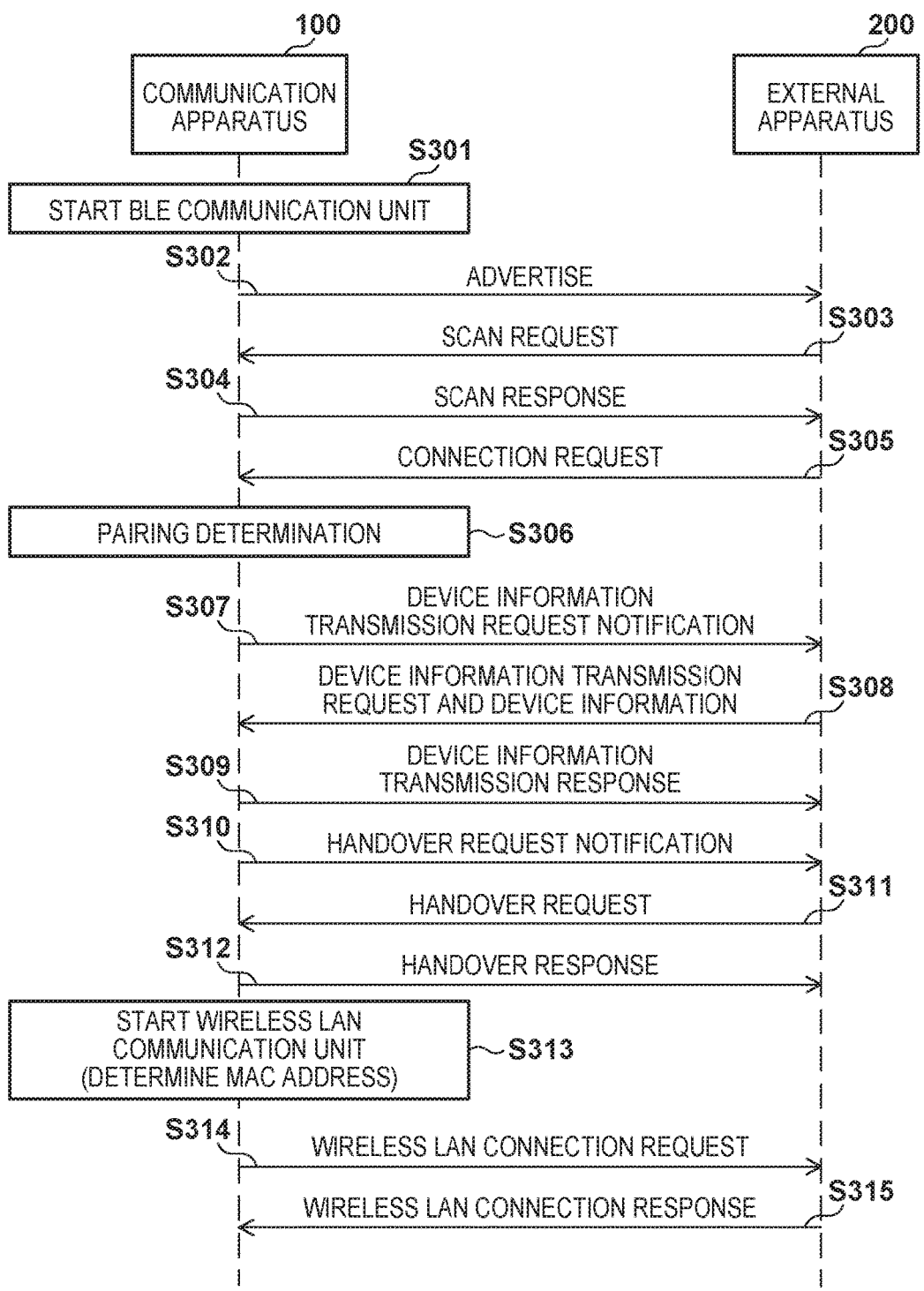

FIG. 4A

| HEADER(16bit) | | | | | PAYLOAD (VARIABLE LENGTH) | |
|---|---|---|---|---|---|---|
| PDU Type (ADV_IND) | RFU | TxAdd | RxAdd | Length | RFU | AdvA | AdvData |

FIG. 4B

| HEADER(16bit) | | | | | PAYLOAD(VARIABLE LENGTH) | | |
|---|---|---|---|---|---|---|---|
| PDU Type (CONNECT_REQ) | RFU | TxAdd | RxAdd | Length | RFU | InitA | AdvA | LLData |

FIG. 4C

| HEADER(16bit) | | | | | | PAYLOAD (VARIABLE LENGTH) |
|---|---|---|---|---|---|---|
| LLID | NESN | SN | MD | RFU | Length | |

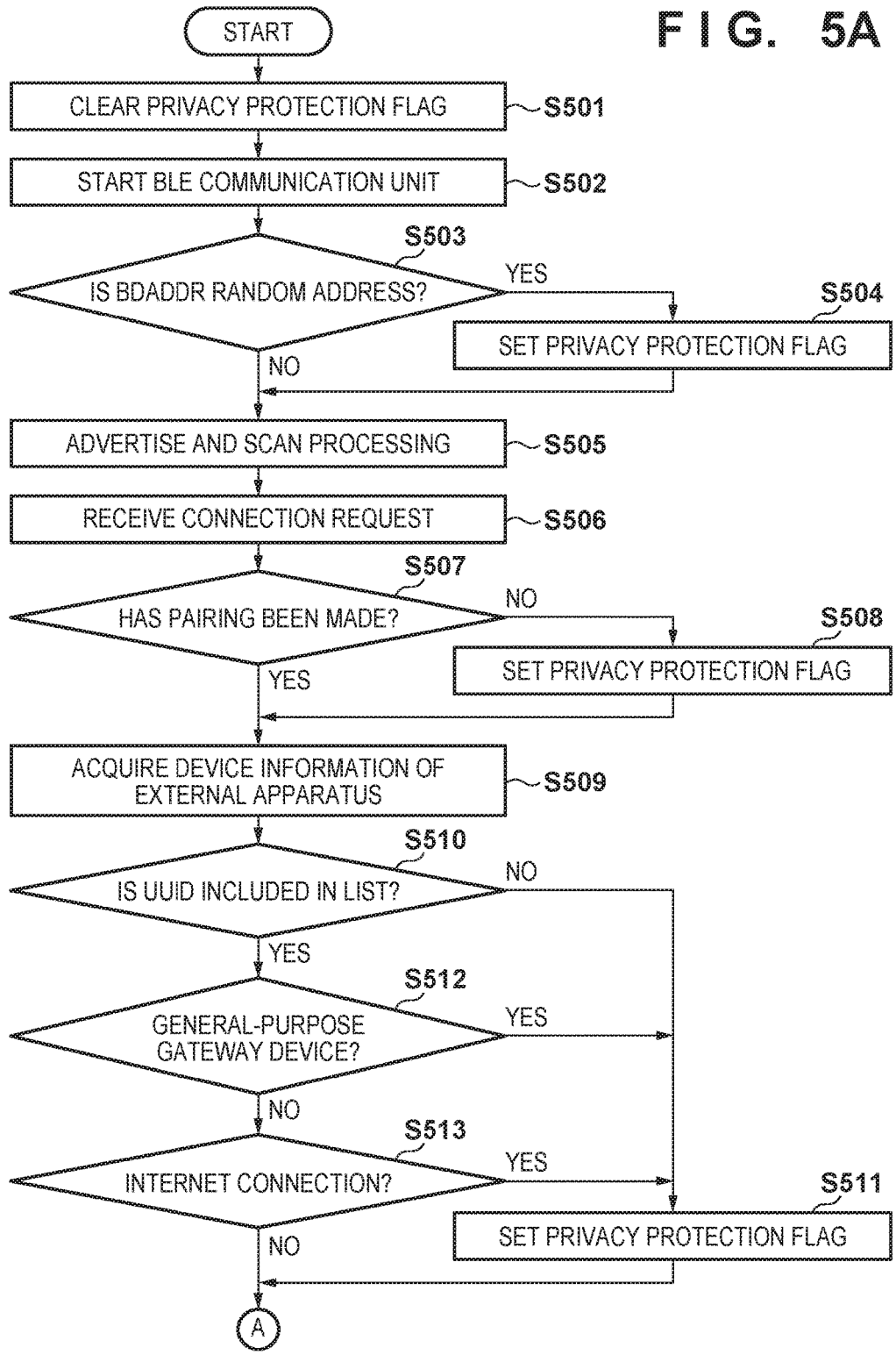

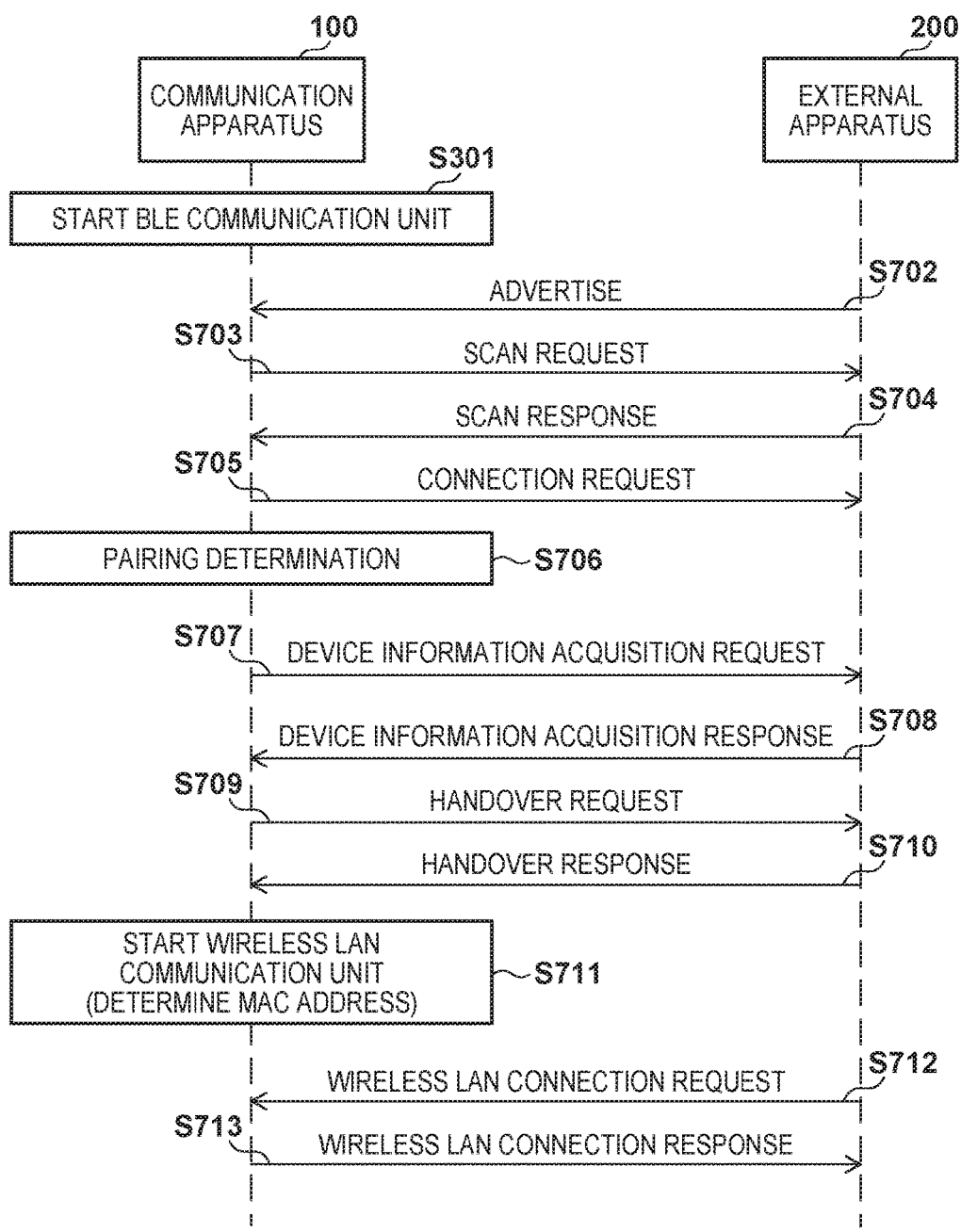

COMMUNICATION APPARATUS THAT WIRELESSLY COMMUNICATES WITH EXTERNAL APPARATUS, CONTROL METHOD, AND STORAGE MEDIUM

BACKGROUND OF THE INVENTION

Field of the Invention

The present invention relates to a communication apparatus that wirelessly communicates with an external apparatus, a control method, and a storage medium.

Description of the Related Art

In recent years, a mechanism called handover has been proposed as a technique for realizing connection settings of wireless LAN communication through a simple operation. Handover is a mechanism for switching to a communication method with a wide communication band such as a wireless LAN, using a communication method with relatively low power consumption such as Bluetooth (registered trademark) Low Energy (BLE).

For example, in the case of receiving a handover request, a communication terminal disclosed in Japanese Patent Laid-Open No. 2011-151746 determines whether or not a communication method to which a switch is to be made is available, and if it is determined that a communication method is not available, makes a change to an available state so as to realize a switch to the communication method.

The BLE standard defines a privacy protection mechanism. The mechanism is specifically a mechanism for randomly changing a device address called a BDADDR at predetermined timings. This mechanism makes it difficult to continuously track the user based on the BDADDR.

On the other hand, the wireless LAN standard does not include such a mechanism, and in wireless LAN communication, a value that is unique to a device and is determined by a vendor is used in general as a device address called a MAC address. Even if the BDADDR is randomized in BLE communication, in the case where the MAC address unique to the device is used due to handover to a wireless LAN, sufficient protection of privacy cannot be realized.

If a MAC address different from the MAC address unique to the device determined by the vendor is used in wireless LAN communication, it is possible to strengthen the privacy protection in the wireless LAN communication. However, if the MAC address is changed, it is not as easy to identify the device, and thus, particularly from the viewpoint of network management, changing the MAC address may be disadvantageous.

SUMMARY OF THE INVENTION

The present invention has been made in light of such a situation, and provides a technique for determining identification information related to a second communication method such as wireless LAN, based on predetermined information related to communication that complies with a first communication method such as BLE.

According to a first aspect of the present invention, there is provided a communication apparatus comprising: a first communication unit configured to communicate with an external apparatus in accordance with a first communication method; a second communication unit configured to communicate with the external apparatus in accordance with a second communication method; a determination unit configured to determine identification information of the second communication unit based on predetermined information related to communication with the external apparatus via the first communication unit; and a control unit configured to perform control so as to establish communication with the external apparatus via the second communication unit, using the determined identification information of the second communication unit.

According to a second aspect of the present invention, there is provided a control method executed by a communication apparatus comprising: a first communication unit configured to communicate with an external apparatus in accordance with a first communication method; and a second communication unit configured to communicate with the external apparatus in accordance with a second communication method, and the control method comprising: determining identification information of the second communication unit based on predetermined information related to communication with the external apparatus via the first communication unit; and performing control so as to establish communication with the external apparatus via the second communication unit, using the determined identification information of the second communication unit.

According to a third aspect of the present invention, there is provided a non-transitory computer-readable storage medium which stores a program for causing a computer of a communication apparatus to execute a control method, the communication apparatus comprising: a first communication unit configured to communicate with an external apparatus in accordance with a first communication method; and a second communication unit configured to communicate with the external apparatus in accordance with a second communication method, and the control method comprising: determining identification information of the second communication unit based on predetermined information related to communication with the external apparatus via the first communication unit; and performing control so as to establish communication with the external apparatus via the second communication unit, using the determined identification information of the second communication unit.

Further features of the present invention will become apparent from the following description of exemplary embodiments with reference to the attached drawings.

BRIEF DESCRIPTION OF THE DRAWINGS

FIG. 3 is a diagram showing a sequence of handover processing that is performed between the communication apparatus 100 and an external apparatus 200, according to a first embodiment.

FIG. 4A is a diagram showing the format of an advertise packet.

FIG. 4B is a diagram showing the format of a connection request packet.

FIG. 4C is a diagram showing the packet format of DATA CHANNEL PDU.

FIG. 5A is a flowchart of handover processing that is executed by the communication apparatus 100, according to the first embodiment.

FIG. 7 is a diagram showing a sequence of handover processing that is performed between a communication apparatus 100 and an external apparatus 200, according to a second embodiment.

DESCRIPTION OF THE EMBODIMENTS

Hereinafter, embodiments of the present invention will be described with reference to the attached drawings. It should be noted that the technical scope of the present invention is defined by the claims, and is not limited by the following respective embodiments. Also, not all of the combinations of the aspects that are described in the embodiments are necessarily essential to the present invention. Also, the aspects that are described in the respective embodiments can be combined as appropriate.

First Embodiment

Internal Configuration of Communication Apparatus

Figure 1:
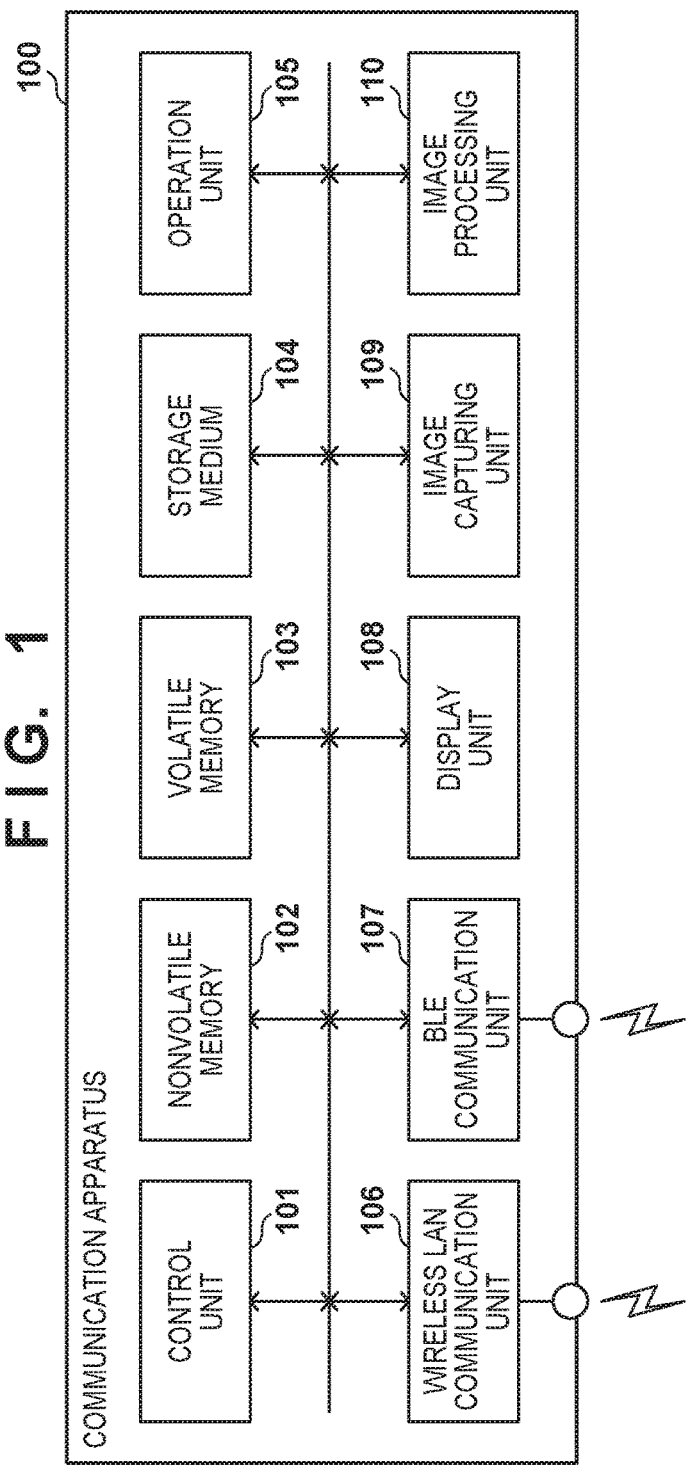
FIG. 1 is a block diagram showing the internal configuration of a communication apparatus 100.

FIG. 1 is a block diagram showing the internal configuration of a communication apparatus 100. The communication apparatus 100 is, for example, a digital camera, a digital video camera, a smartwatch, or the like. A control unit 101 controls each constituent element of the communication apparatus 100 by executing a control program stored in a nonvolatile memory 102. The control unit 101 is constituted by one or more processors such as a CPU and an MPU.

The nonvolatile memory 102 stores control programs that are executed by the control unit 101. A volatile memory 103 is used as a work memory when the control unit 101 executes a control program. In addition, the volatile memory 103 is also used as a region in which data that is transferred by a wireless LAN communication unit 106 or a BLE communication unit 107 is stored.

A storage medium 104 is used as a region in which data that is transferred by the wireless LAN communication unit 106 or the BLE communication unit 107, image data that is input by an image capturing unit 109, or the like is stored. The storage medium 104 may be a flash memory, a memory card, an HDD, or the like that has a large capacity.

An operation unit 105 accepts a user operation, and transmits information that has been input, to the control unit 101. The operation unit 105 is constituted by a mode dial, a touch panel, a button switch, a cross key, or the like.

The wireless LAN communication unit 106 (a second communication unit) is a communication unit that performs wireless LAN communication that complies with a wireless LAN standard (IEEE 802.11 standard). The wireless LAN communication unit 106 functions as both a station (STA) and an access point (AP) of a wireless LAN.

The BLE communication unit 107 (a first communication unit) is a communication unit that performs communication that complies with the Bluetooth (registered trademark) Low Energy standard (BLE communication). BLE communication has the characteristics of having a smaller transfer band than wireless LAN communication and operating with low power consumption. The BLE communication unit 107 functions as both a central and a peripheral unit.

A display unit 108 has the function of outputting information that is visually recognizable in the manner of an LCD panel and an LED.

The image capturing unit 109 is constituted by an imaging lens, a diaphragm, a shutter, an image sensor (e.g., a CMOS sensor), an A/D converter, and the like, generates image data by performing image capture processing, and deploys the data to the volatile memory 103.

An image processing unit 110 executes various types of processing related to developing processing such as image correction, color conversion, resizing, and encoding/decoding on image data deployed in the volatile memory 103.

Configuration of Communication System

Figure 2:
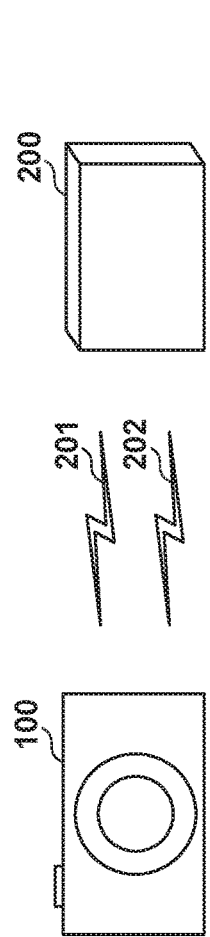
FIG. 2 is a diagram showing the configuration of a communication system.

FIG. 2 is a diagram showing the configuration of a communication system in this embodiment. In the communication system, the communication apparatus 100 communicates with an external apparatus 200 via BLE communication 201 and wireless LAN communication 202.

The communication apparatus 100 and the external apparatus 200 can communicate with each other through the BLE communication 201 and the wireless LAN communication 202 in this manner. In addition, from a state of not being connected to each other through the wireless LAN communication 202, the communication apparatus 100 and the external apparatus 200 can perform handover processing for executing connection processing through the wireless LAN communication 202 on the occasion of the BLE communication 201.

The external apparatus 200 is, for example, a gateway device, a smartphone, a tablet, or the like. A gateway device is a device that is connected to the Internet (not illustrated), and has the function of mediating between a communication apparatus and the Internet. A gateway device is installed in a place in which communication apparatuses of a specified small number of users are connected, such as a user's home or office, and a place in which communication apparatuses of an unspecified large number of users are connected, such as a railway station or a commercial facility. In this embodiment, the former is referred to as a dedicated gateway device, and the latter is referred to as a general-purpose gateway device.

Here, the need for privacy protection when the communication apparatus 100 is connected to the external apparatus 200 will be described. The need for privacy protection differs according to the type of the external apparatus 200.

In general, in the case where a device that is envisioned to be used by an unspecified large number of users such as a general-purpose gateway device is a connection partner, there are strong demands from the user to prevent a third party from monitoring the connection. Therefore, it is desirable that the value of the device address of the communication apparatus 100 is randomized. Here, the device address refers to BDADDR in BLE communication and a MAC address in wireless LAN communication.

On the other hand, in the case of a dedicated gateway device, the network system is properly managed by an administrator in most cases. A MAC address filtering function is applied in most cases in order to restrict devices that are connectable through wireless LAN communication, and randomizing the value of the MAC address is not desired. In addition, in the case where a smartphone, a tablet or the like is a connection partner, the need for privacy protection is low because one-to-one connection is performed, and it is desirable to use, as a MAC address, a value that is unique to the device, and is determined by the vendor, as is conventional.

Sequence of Handover Processing

FIG. 3 is a diagram showing a sequence of handover processing that is performed between the communication apparatus 100 and the external apparatus 200. In this sequence, the communication apparatus 100 has the role of being a peripheral (ATT server) and the external apparatus 200 has the role of being a central (ATT client) in BLE. ATT refers to an ATTRIBUTE protocol that is defined by the Bluetooth (registered trademark) standard. In addition, the communication apparatus 100 has the role of being a STA and the external apparatus 200 has the role of being an AP in a wireless LAN.

The initial state of this sequence is a state where, in the communication apparatus 100, the BLE communication unit 107 and the wireless LAN communication unit 106 are not started, and, in the external apparatus 200, a BLE function and a wireless LAN function are enabled. In addition, in this sequence, steps S302 to S305 and steps S307 to S312 correspond to BLE communication, and steps S314 and S315 correspond to wireless LAN communication.

In this sequence, processing of each step that is executed by the communication apparatus 100 is realized by the control unit 101 executing a control program stored in the nonvolatile memory 102 using the volatile memory 103 as a work memory, unless specifically stated otherwise. Similarly, processing of each step that is executed by the external apparatus 200 is realized by a control unit (not illustrated) of the external apparatus 200 executing a control program, unless specifically stated otherwise.

In step S301, the control unit 101 starts the BLE communication unit 107 according to a user operation performed via the operation unit 105, or the like. Specifically, the control unit 101 performs control so as to supply power or a clock to the BLE communication unit 107. This enables a BLE advertise function in the communication apparatus 100.

In step S302, the control unit 101 transmits a BLE advertise packet. This packet is received by the external apparatus 200. Here, the advertise packet is a packet whose PDU Type is ADV_IND, in ADVERTISING CHANNEL PDU defined according to a Bluetooth (registered trademark) standard.

FIG. 4A shows the format of an advertise packet. The advertise packet is constituted by a header and a payload, and AdvA of the payload is the BDADDR of the apparatus that transmitted the advertise packet. Therefore. AdvA of the advertise packet transmitted in step S302 is the BDADDR of the communication apparatus 100.

In step S303, the external apparatus 200 transmits a BLE scan request packet to the communication apparatus 100. The scan request packet is a packet whose PDU Type is SCAN_REQ, in the above ADVERTISING CHANNEL PDU. The scan request packet is used for acquiring detailed information of the device that transmitted the advertise packet.

In step S304, the control unit 101 transmits a BLE scan response packet to the external apparatus 200. The scan response packet is a packet whose PDU Type is SCAN_RSP, in the above ADVERTISING CHANNEL PDU. The scan response packet is a response to the scan request packet, and stores detailed information of the device that transmitted the advertise packet.

In step S305, the external apparatus 200 transmits a BLE connection request packet to the communication apparatus 100. The connection request packet is a packet whose PDU Type is CONNECT_REQ, in the above ADVERTISING CHANNEL PDU.

FIG. 4B shows the format of a connection request packet. The connection request packet is constituted by a header and a payload, and InitA in the payload is the BDADDR of the device that transmitted the connection request packet. In addition, AdvA is the BDADDR of the device that transmitted the advertise packet. Therefore, in the connection request packet transmitted in step S305, InitA is the BDADDR of the external apparatus 200, and AdvA is the BDADDR of the communication apparatus 100.

In step S305. BLE communication connection is established between the communication apparatus 100 and the external apparatus 200. After this, communication that complies with the ATT protocol is performed using DATA CHANNEL PDU that is defined according to the Bluetooth (registered trademark) standard. FIG. 4C shows the packet format of DATA CHANNEL PDU.

In step S306, the control unit 101 determines whether or not pairing with the external apparatus 200 has been made (whether or not pairing with the external apparatus 200 is complete). Here, pairing refers to pairing that is defined according to the Bluetooth (registered trademark) standard, and may include bonding. Accordingly, pairing is processing for exchanging information between the communication apparatus 100 and the external apparatus 200 in advance, exchanging keys for authentication and encrypted communication, and the like. Whether or not pairing with the external apparatus 200 has been made can be determined by using the BDADDR of the external apparatus 20X). The communication apparatus 100 determines whether or not pairing with the external apparatus 200 has been made, using the BDADDR of the external apparatus 200 included in the connection request packet received in step S305.

In step S307, the control unit 101 transmits a device information transmission request notification to the external apparatus 200, using a Notification method of the ATT protocol. This requests the external apparatus 200 to transmit a device information transmission request.

In step S308, the external apparatus 200 transmits a device information transmission request and device information of the external apparatus 200 to the communication apparatus 100 using a Request method of the ATT protocol.

In step S309, the control unit 101 transmits response information to the external apparatus 200 using a Response method of the ATT protocol. This indicates that the request for transmitting the device information in step S308 was successful.

In step S310, the control unit 101 transmits a handover request notification to the external apparatus 200 using the Notification method of the ATT protocol. This requests the external apparatus 200 to transmit a handover request.

In step S311, the external apparatus 200 transmits a handover request to the communication apparatus 100 using the Request method of the ATT protocol. This handover request includes information (setting information) for establishing connection of wireless LAN communication between the communication apparatus 100 and the external apparatus 200. Specifically, the information is role information, an SSID (Service Set IDentifier), an encryption key, and the like. In this sequence, the role information indicates that the external apparatus 200 is an AP (the communication apparatus 100 is an STA).

In step S312, the control unit 101 transmits response information to the external apparatus 200 using the Response method of the ATT protocol. This indicates that the handover request in step S311 was successful. In this manner, the setting information is shared between the communication apparatus 100 and the external apparatus 200 via the BLE communication unit 107.

In step S313, the control unit 101 starts the wireless LAN communication unit 106. Specifically, the control unit 101 performs control so as to supply power or a clock to the wireless LAN communication unit 106. At this time, the control unit 101 also determines the value of the MAC address of the communication apparatus 100 (the wireless LAN communication unit 106). Note that determination of a MAC address will be described later in detail with reference to FIGS. 5A and 5B.

In step S314, the control unit 101 transmits a wireless LAN connection request packet to the external apparatus 200. This is a request for connection to a wireless LAN network generated by the external apparatus 200.

In step S315, the external apparatus 200 transmits a wireless LAN connection response packet to the communication apparatus 100. This indicates that the connection request in step S314 was successful. From this step onward, communication using a wireless LAN is possible between the communication apparatus 100 and the external apparatus 200.

Flowchart of Handover Processing

Figure 5B:
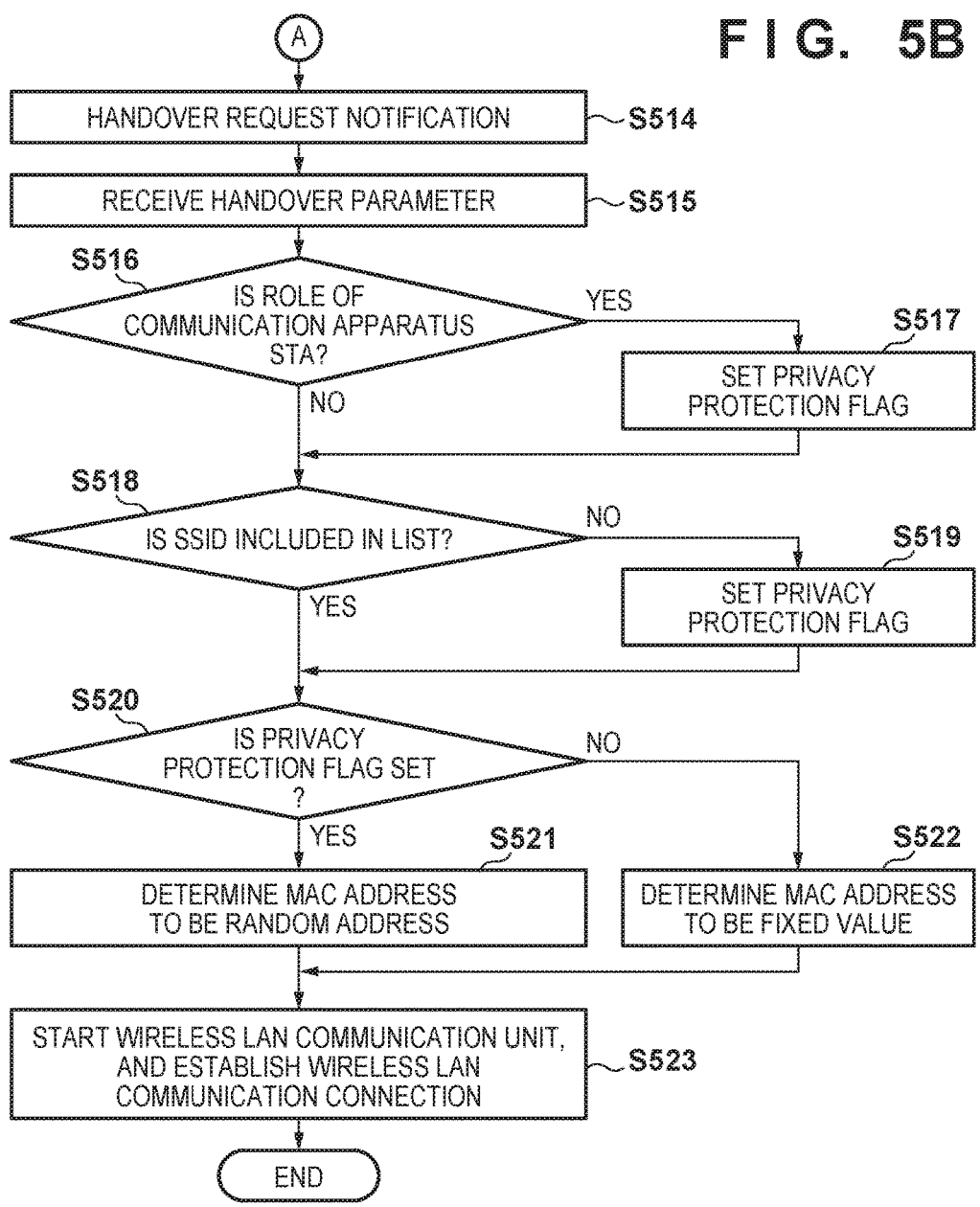
FIG. 5B is a flowchart of handover processing that is executed by the communication apparatus 100, according to the first embodiment.

FIGS. 5A and 5B show a flowchart of handover processing that is executed by the communication apparatus 100. In this flowchart, processing of each step that is executed by the communication apparatus 100 is realized by the control unit 101 executing a control program stored in the nonvolatile memory 102 using the volatile memory 103 as a work memory, unless specifically stated otherwise.

In step S501, the control unit 101 clears a privacy protection flag. The privacy protection flag indicates whether or not privacy protection in wireless LAN communication is required for the apparatus to which handover has been made. If the flag is set, it is indicated that privacy protection is necessary, and if the flag is not set, it is indicated that privacy protection is not necessary. The privacy protection flag can be provided as a variable of a software program that is executed by the control unit 101, and is managed in the volatile memory 103, the nonvolatile memory 102, or the like.

In step S502, the control unit 101 starts the BLE communication unit 107. Step S502 corresponds to step S301 in FIG. 3.

In step S503, the control unit 101 determines whether or not the BDADDR of the communication apparatus 100 (the BLE communication unit 107) is a random address. If the control unit 101 determines that the BDADDR is a random address, the procedure advances to step S504, otherwise the procedure advances to step S505. In step S504, the control unit 101 sets the privacy protection flag.

Here, a random address used as the BDADDR is a Random Device Address that is defined according to the Bluetooth (registered trademark) standard. In the case where a random address is used as the BDADDR, it is conceivable that the need for privacy protection is high in pre-handover BLE communication. Therefore, processing for setting a privacy protection flag is performed such that privacy protection is also sufficiently ensured in wireless LAN communication. Selecting whether or not to set a random address as the BDADDR may be set in the communication apparatus 100 in a fixed manner at the time of design. Alternatively, the communication apparatus 100 may be configured such that the user can make the selection via the operation unit 105. For example, the communication apparatus 100 may be configured to have a privacy protection mode as an operation mode of the communication apparatus 100 such that the user can select the privacy protection mode as necessary.

In step S505, the control unit 101 controls the BLE communication unit 107 so as to execute advertise processing and scan processing between the communication apparatus 100 and the external apparatus 200. Step S505 corresponds to steps S302 to S304 in FIG. 3.

In step S506, the control unit 101 controls the BLE communication unit 107 so as to receive a BLE connection request. Step S506 corresponds to step S305 in FIG. 3.

In step S507, the control unit 101 determines whether or not pairing with the external apparatus 200 has been made. If the control unit 101 determines that pairing with the external apparatus 200 has not been made, the procedure advances to step S508, otherwise the procedure advances to step S509. Step S507 corresponds to step S306 in FIG. 3. In step S508, the control unit 101 sets the privacy protection flag.

In the case where the external apparatus 200 is a dedicated gateway device as described above, a smartphone, a tablet, or the like, it is highly likely that the external apparatus 200 is dedicated to the user that owns the communication apparatus 100. In this case, it is highly likely that the setting of pairing between the communication apparatus 100 and the external apparatus 200 has been performed. Therefore, in the case where the pairing has been made, the control unit 101 determines that the need for privacy protection is low, and does not perform processing for setting a privacy protection flag. On the other hand, in the case where the external apparatus 200 is a general-purpose gateway device, it is highly likely that the external apparatus 200 is not a device dedicated to the user of the communication apparatus 100, and is installed in a place where an unspecified large number of users visit. In this case, the likelihood that setting of pairing between the communication apparatus 100 and the external apparatus 200 has been performed is low. Therefore, in the case where pairing has not been made, the control unit 101 determines that the need for privacy protection is high, and sets a privacy protection flag.

In step S509, the control unit 101 controls the BLE communication unit 107 so as to acquire the device information of the external apparatus 200. Step S509 corresponds to steps S307 to step S309 in FIG. 3.

In step S510, the control unit 101 determines whether or not a UUID of the external apparatus 200 (the BLE communication unit 107) included in the device information acquired in step S509 is included in a reliable UUID list stored in the nonvolatile memory 102. If the control unit 101 determines that the UUID is not included in the reliable UUID list, the procedure advances to step S511, otherwise the procedure advances to step S512. In step S511, the control unit 101 sets a privacy protection flag.

Here, the UUID stands for Universally Unique IDentifier, and is an identifier (identification information) that uniquely indicates a device. The communication apparatus 100 has information (the reliable UUID list) regarding the UUIDs of reliable devices (external apparatuses) stored in the nonvolatile memory 102 in advance. In the case where the acquired UUID is not included in the reliable UUID list, the control unit 101 determines that the need for privacy protection is high, and sets a privacy protection flag.

In step S512, the control unit 101 determines whether or not the device information acquired in step S509 includes information indicating that the external apparatus 200 is a general-purpose gateway device (use by an unspecified large number of users is envisioned). If the control unit 101 determines that such information is included in the device information, the procedure advances to step S511, otherwise the procedure advances to step S513.

In step S513, the control unit 101 determines whether or not the device information acquired in step S509 includes information indicating that the external apparatus 200 is connected to the Internet. If the control unit 101 determines that such information is included in the device information, the procedure advances to step S511, otherwise the procedure advances to step S514.

In step S514, the control unit 101 controls the BLE communication unit 107 to make a request to the external apparatus 200 for handover. Step S514 corresponds to step S310 in FIG. 3.

In step S515, the control unit 101 controls the BLE communication unit 107 so as to receive parameter information related to handover processing from the external apparatus 200. Step S515 corresponds to steps S311 and S312 in FIG. 3.

In step S516, the control unit 101 determines whether or not the parameter information acquired in step S515 includes information indicating that the communication apparatus 100 is operating as a STA (the external apparatus 200 operates as an AP), which is its role in wireless LAN communication. If the control unit 101 determines that such information is included in the parameter information, the procedure advances to step S517, otherwise the procedure advances to step S518. In step S517, the control unit 101 sets a privacy protection flag.

A general-purpose gateway device necessarily operates as an AP, and thus, in the case where the external apparatus 200 operates as an AP, the control unit 101 determines that it is highly likely that the external apparatus 200 is a general-purpose gateway device, and sets a privacy protection flag.

Note that, as described above, the sequence in FIG. 3 corresponds to a case where the communication apparatus 100 operates as a STA (the external apparatus 200 operates as an AP). A case where the communication apparatus 100 operates as an AP (the external apparatus 200 operates as a STA) will be described in a second embodiment.

In step S518, the control unit 101 determines whether or not an SSID included in the parameter information acquired in step S515 is included in the reliable SSID list stored in the nonvolatile memory 102. If the control unit 101 determines that the acquired SSID is not included in the reliable SSID list, the procedure advances to step S519, otherwise the procedure advances to step S520. In step S519, the control unit 101 sets a privacy protection flag.

The communication apparatus 100 has information (the reliable SSID list) regarding the SSIDs of the reliable wireless LAN networks stored in the nonvolatile memory 102 in advance. If the acquired SSID is not included in the reliable SSID list, the control unit 101 determines that the need for privacy protection is high, and sets a privacy protection flag.

In step S520, the control unit 101 determines whether or not a privacy protection flag is set. If the control unit 101 determines that a privacy protection flag is set, the procedure advances to step S521, otherwise the procedure advances to step S522.

In step S521, the control unit 101 randomly determines a MAC address (a MAC address of the wireless LAN communication unit 106) that is used in wireless LAN communication.

In step S522, the control unit 101 determines a MAC address (MAC address of the wireless LAN communication unit 106) that is used in wireless LAN communication to be a fixed value unique to the device.

Figure 6:
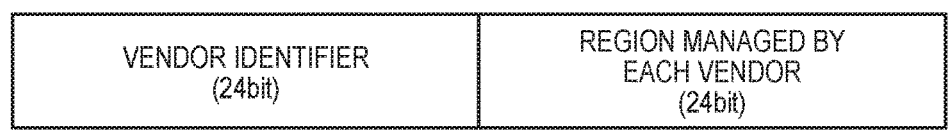
FIG. 6 is a diagram showing the format of a MAC address.

FIG. 6 shows the format of a MAC address. As shown in FIG. 6, a MAC address is constituted by a region (24 bits) of a vendor identifier (an organizationally unique identifier) and a region (24 bits) managed by each vendor. Information uniquely indicating the vendor of the communication apparatus 100 is set in the region of the vendor identifier. In the region managed by each vendor, a random value is set in step S521, and a serial number that is unique to the device, and has been assigned to the device by the vendor, is set in step S522. Accordingly, the control unit 101 randomly determines a portion excluding the organizationally unique identifier of the MAC address.

In step S523, the control unit 101 starts the wireless LAN communication unit 106, and establishes wireless LAN communication connection with the external apparatus 200. Steps S520 to S523 correspond to steps S313 to S315 in FIG. 3.

Note that, in FIGS. 5A and 5B, in the case where at least one of a plurality of criteria (e.g., steps S503 and S507) is satisfied, a privacy protection flag is set. However, this embodiment is not limited to such a configuration, and the control unit 101 may be configured to set a privacy protection flag in the case where two or more criteria are satisfied.

In addition, a plurality of specific criteria (e.g., steps S503 and S507) have been described as criteria for determining whether or not to set a privacy protection flag, with reference to FIGS. 5A and 5B. However, these criteria are merely exemplary. For example, the control unit 101 may only use some of the criteria that have been described here, or may use another type of criteria that is not described here. In other words, the control unit 101 may determine whether or not to set a privacy protection flag, according to any criteria in which predetermined information related to communication with the external apparatus 200 via the BLE communication unit 107 is used.

In addition, in FIGS. 5A and 5B, in the case where a privacy protection flag is set, a portion of the MAC address (the region managed by each vendor) is randomly determined. However, this embodiment is not limited to such a configuration. Even in the case where a MAC address is not randomly determined, privacy protection can be realized to some degree by determining, as the MAC address, a value that is different from that in a case where a privacy protection flag is not set (step S522). Therefore, this embodiment encompasses any configuration in which a MAC address is determined based on whether or not a privacy protection flag is set (i.e., based on predetermined information related to communication with the external apparatus 200 via the BLE communication unit 107).

Moreover, in the above description, BLE and a wireless LAN are used as examples of communication methods, but the communication methods of this embodiment are not limited thereto, and this embodiment can be applied to any communication method. In addition, the BDADDR and UUID are used as identification information related to BLE, and a MAC address is used as identification information related to a wireless LAN, but, in the case of using a communication method other than BLE and a wireless LAN, it is sufficient that the identification information is changed as appropriate. For example, in step S503, in the case where at least a portion of identification information related to an adopted first communication method is randomly determined, the control unit 101 can advance the procedure to step S504. Also, in step S521, the control unit 101 can randomly determine at least a portion of identification information related to an adopted second communication method. For example, in the case where predetermined information satisfies a predetermined condition, the control unit 101 randomly determines at least a portion of the identification information related to the second communication method, and, in the case where the predetermined information does not satisfy the predetermined condition, determines the identification information related to the second communication method to be a specific value.

As described above, according to the first embodiment, the communication apparatus 100 determines identification information (a MAC address) of the wireless LAN communication unit 106 based on predetermined information related to communication with the external apparatus 200 via the BLE communication unit 107. Therefore, according to this embodiment, identification information related to the second communication method such as a wireless LAN can be determined based on predetermined information related to communication that complies with the first communication method such as BLE.

Second Embodiment

In the first embodiment, the communication apparatus 100 has the role of being a peripheral (ATT server) and the external apparatus 200 has the role of being a central (ATT client) in BLE. Also, the communication apparatus 100 has the role of being a STA and the external apparatus 200 has the role of being an AP in a wireless LAN.

However, the present invention does not limit the roles of the communication apparatus 100 and the external apparatus 200 in BLE and a wireless LAN. In view of this, in a second embodiment, an example will be described in which the roles of a communication apparatus 100 and an external apparatus 200 are different from those in the first embodiment.

Note that, in the second embodiment, basic configurations of the communication apparatus 100 and a communication system are similar to those in the first embodiment (see FIGS. 1 and 2). Content different from those of the first embodiment will be mainly described below.

Sequence of Handover Processing

FIG. 7 is a diagram showing a sequence of handover processing that is performed between the communication apparatus 100 and the external apparatus 200 according to the second embodiment. In FIG. 7, the same reference numerals as those in FIG. 3 are assigned to steps in which processing that is the same or similar to the processing in FIG. 3 is performed.

In this sequence, the communication apparatus 100 has the role of being a central (ATT client) and the external apparatus 200 has the role of being a peripheral (ATT server) in BLE. Also, the communication apparatus 100 has the role of being an AP and the external apparatus 200 has the role of being a STA in a wireless LAN.

In this sequence, processing in each step that is executed by the communication apparatus 100 is realized by a control unit 101 executing a control program stored in a nonvolatile memory 102 using a volatile memory 103 as a work memory unless specifically stated otherwise. Similarly, processing in each step that is executed by the external apparatus 200 is realized by a control unit (not illustrated) of the external apparatus 200 executing a control program unless specifically stated otherwise.

In step S702, the external apparatus 200 transmits a BLE advertise packet. This packet is received by the communication apparatus 100. In step S703, the control unit 101 transmits a BLE scan request packet to the external apparatus 200. In step S704, the external apparatus 200 transmits a BLE scan response packet to the communication apparatus 100. In step S705, the control unit 101 transmits a BLE connection request packet to the external apparatus 200. In step S705, a BLE communication connection is established between the communication apparatus 100 and the external apparatus 200.

In step S706, the control unit 101 determines whether or not pairing with the external apparatus 200 has been made (pairing with the external apparatus 200 is complete). Whether or not pairing with the external apparatus 200 has been made can be determined by using the BDADDR of the external apparatus 200. The control unit 101 performs the determination using the advertise packet received in step S702, or the BDADDR of the external apparatus 200 included in the scan response packet received in step S704.

In step S707, the control unit 101 transmits a device information acquisition request to the external apparatus 200 using a Request method of the ATT protocol. This request is for acquiring device information from the external apparatus 200.

In step S708, the external apparatus 200 transmits the device information of the external apparatus 200 to the communication apparatus 100 using the Response method of the ATT protocol.

In step S709, the control unit 101 transmits a handover request to the external apparatus 200 using the Request method of the ATT protocol. This handover request includes information (setting information) for establishing connection of wireless LAN communication with the external apparatus 200. Specifically, the information is role information, an SSID (Service Set IDentifier), an encryption key, and the like. In this sequence, the role information indicates that the external apparatus 200 is a STA (the communication apparatus 100 is an AP).

In step S710, the external apparatus 200 transmits a handover response to the communication apparatus 100 using the Response method of the ATT protocol. This indicates that the handover request in step S709 was successful.

In step S711, the control unit 101 starts a wireless LAN communication unit 106. Specifically, the control unit 101 performs control so as to supply power or a clock to the wireless LAN communication unit 106. At this time, the control unit 101 also determines the value of a MAC address of the communication apparatus 100 (the wireless LAN communication unit 106). The control unit 101 also generates a wireless LAN network corresponding to the SSID and encryption key notified to the external apparatus 200 in step S709. Note that determination of a MAC address will be described in detail later with reference to FIGS. 8A-8B.

In step S712, the external apparatus 200 transmits a wireless LAN connection request packet to the communication apparatus 100. In step S713, the control unit 101 transmits a wireless LAN connection response packet to the external apparatus 200. This indicates that the connection request in step S712 was successful. From this step onward, communication using the wireless LAN is possible between the communication apparatus 100 and the external apparatus 200.

Flowchart of Handover Processing

Figure 8A:
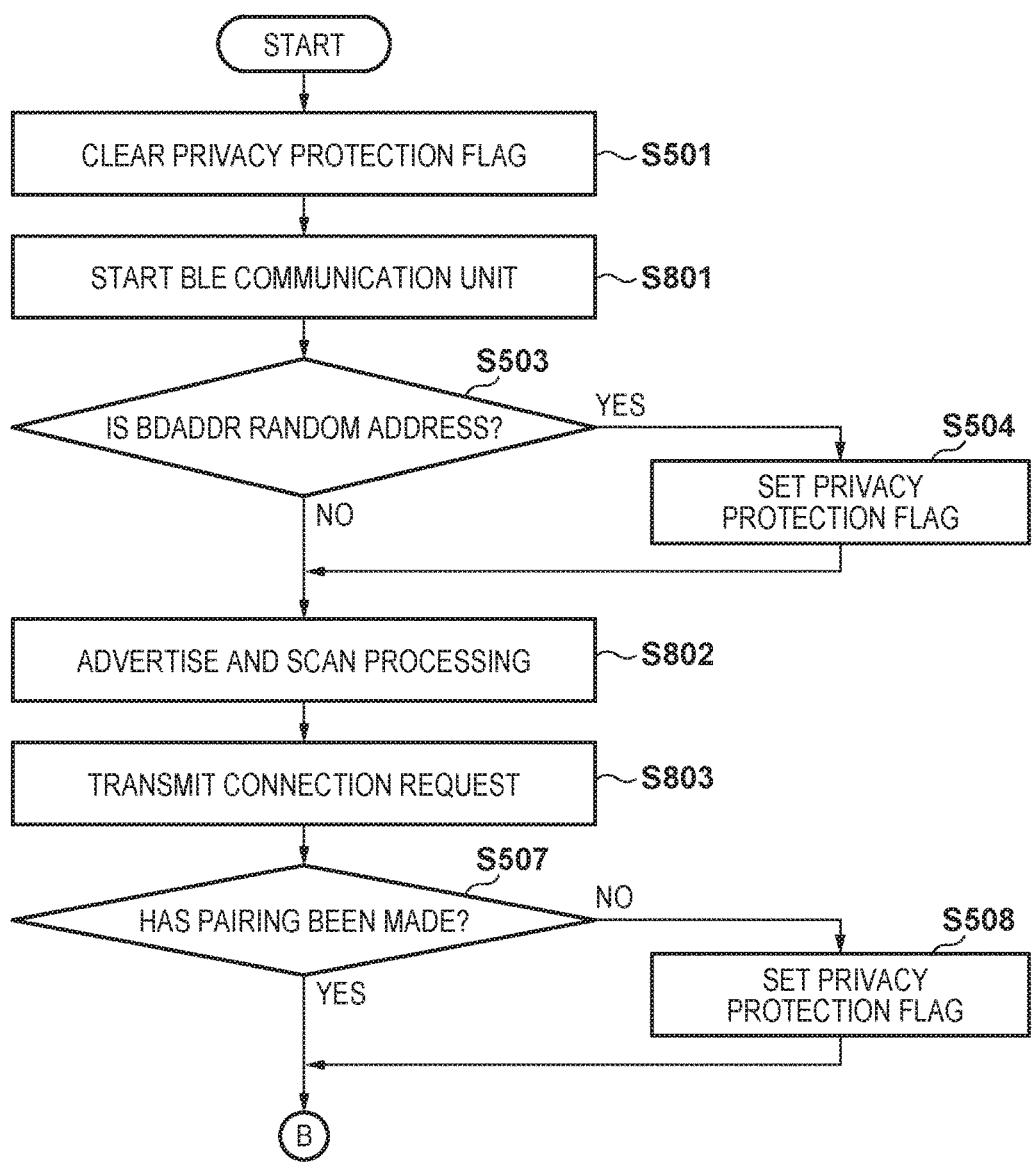
FIGS. 8A-8B are flowcharts of handover processing that is executed by the communication apparatus 100, according to the second embodiment.
Figure 8B:
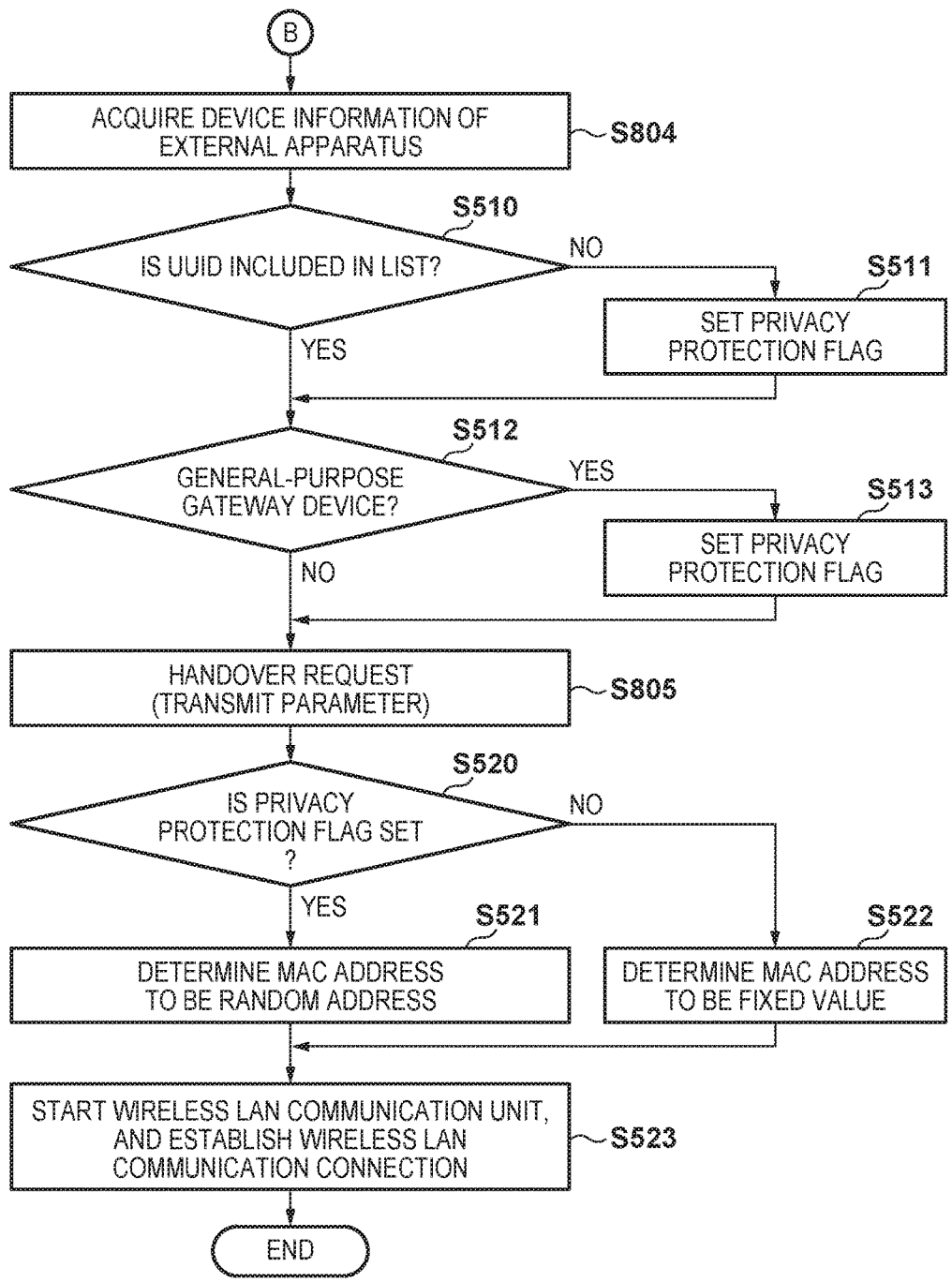

FIGS. 8A-8B are flowcharts of handover processing that is executed by the communication apparatus 100 according to the second embodiment. In this flowchart, processing in each step that is executed by the communication apparatus 100 is realized by the control unit 101 executing a control program stored in the nonvolatile memory 102 using the volatile memory 103 as a work memory unless specifically stated otherwise.

In FIGS. 8A-8B, the same reference numerals as those in FIGS. 5A and 5B are assigned to steps in which processing that is the same as or similar to the processing in FIGS. 5A and 5B is performed. Note that steps described as corresponding to steps in FIG. 3, in the description with reference to FIGS. 5A and 5B, correspond to steps in FIG. 7, in FIGS. 8A-8B. Specifically, steps S507 and S508 correspond to step S706 in FIG. 7, and steps S520 to S523 correspond to steps S711 to S713 in FIG. 7.

In step S801, the control unit 101 starts a BLE communication unit 107. Step S801 corresponds to step S301 in FIG. 7.

In step S802, the control unit 101 controls the BLE communication unit 107 so as to execute advertise processing and scan processing with the external apparatus 200. Step S802 corresponds to steps S702 to S704 in FIG. 7.

In step S803, the control unit 101 controls the BLE communication unit 107 so as to transmit a BLE connection request. Step S803 corresponds to step S705 in FIG. 7.

In step S804, the control unit 101 controls the BLE communication unit 107 so as to acquire the device information of the external apparatus 200. Step S804 corresponds to steps S707 and S708 in FIG. 7.

In step S805, the control unit 101 controls the BLE communication unit 107 so as to transmit a handover request to the external apparatus 200. The handover request includes parameter information related to handover processing. Step S805 corresponds to steps S709 and S710 in FIG. 7.

As described above, according to the second embodiment, the communication apparatus 100 has the role of being a central (ATT client) and the external apparatus 200 has the role of being a peripheral (ATT server) in BLE. Also, the communication apparatus 100 has the role of being an AP and the external apparatus 200 has the role of being a STA in a wireless LAN. Even in the case where the roles of the communication apparatus 100 and the external apparatus 200 in BLE and a wireless LAN are different from those in the first embodiment in this manner, it is possible to determine identification information related to the second communication method based on predetermined information related to communication that complies with the first communication method.

As a matter of course, roles of the communication apparatus 100 and the external apparatus 200 in BLE and a wireless LAN are not limited to those in the second embodiment. Accordingly, in the present invention, there is no limitation on the roles of the communication apparatus 100 and the external apparatus 200 in BLE and a wireless LAN. Therefore, for example, a configuration may be adopted in which the communication apparatus 100 has the role of being a peripheral (ATT server) and the external apparatus 200 has the role of being a central (ATT client) in BLE, and the communication apparatus 100 has the role of being an AP and the external apparatus 200 has the role being a STA in a wireless LAN. Alternatively, a configuration may be adopted in which the communication apparatus 100 has the role of being a central (ATT client) and the external apparatus 200 has the role of being a peripheral (ATT server) in BLE, and the communication apparatus 100 has the role of being a STA and the external apparatus 200 has the role of being an AP in a wireless LAN.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-141209, filed Jul. 20, 2017 which is hereby incorporated by reference herein in its entirety.

What is claimed is:

1. A communication apparatus comprising:
    a first communication unit configured to communicate with an external apparatus in accordance with a first communication method;
    a second communication unit configured to communicate with the external apparatus in accordance with a second communication method;
    a determination unit configured to determine identification information of the second communication unit based on predetermined information related to communication with the external apparatus via the first communication unit; and
    a control unit configured to perform control so as to establish communication with external apparatus via the second communication unit, using the determined identification information of the second communication unit,
    wherein the determination unit randomly determines at least a portion of the identification information of the second communication unit in a case where the predetermined information satisfies a predetermined condition, and
    determines the identification information of the second communication unit to be a specific value in a case where the predetermined information does not satisfy the predetermined condition.

2. The communication apparatus according to claim 1, wherein, in a case where at least a portion of identification information of the first communication unit is randomly determined, the determination unit randomly determines at least a portion of the identification information of the second communication unit.

3. The communication apparatus according to claim 1, wherein the determination unit
determines whether or not pairing with the external apparatus is complete, based on identification information of the external apparatus for communication via the first communication unit, and
in a case where the pairing is complete, randomly determines at least a portion of the identification information of the second communication unit.

4. The communication apparatus according to claim 1, wherein, in a case where information indicating that use of the external apparatus by an unspecified large number of users is envisioned is received from the external apparatus via the first communication unit, the determination unit randomly determines at least a portion of the identification information of the second communication unit.

5. The communication apparatus according to claim 1, wherein, in a case where information indicating that the external apparatus is connected to the Internet is received from the external apparatus via the first communication unit, the determination unit randomly determines at least a portion of the identification information of the second communication unit.

6. The communication apparatus according to claim 1, wherein, in a case where information indicating that the external apparatus operates as an access point in a network that is used for communication with the external apparatus via the second communication unit is received from the external apparatus via the first communication unit, the determination unit randomly determines at least a portion of the identification information of the second communication unit.

7. The communication apparatus according to claim 1, wherein, in a case where identification information of a network that has been received from the external apparatus via the first communication unit, and is used for communication with the external apparatus via the second communication unit is not stored in a storage medium, the determination unit randomly determines at least a portion of the identification information of the second communication unit.

8. The communication apparatus according to claim 1, wherein the second communication method is a communication method that is based on a wireless LAN standard,
the identification information of the second communication unit is a MAC address, and
in a case where the predetermined information satisfies the predetermined condition, the determination unit randomly determines a portion of the MAC address excluding an organizationally unique identifier.

9. The communication apparatus according to claim 1, wherein the first communication method is a communication method that is based on a Bluetooth Low Energy standard, and
in a case where a UUID of the second communication unit received from the external apparatus via the first communication unit is not stored in a storage medium, the determination unit randomly determines at least a portion of the identification information of the second communication Unit.

10. The communication apparatus according to claim 1, wherein the first communication method is a communication method at is based on a Bluetooth Low Energy standard, and
the second communication method is a communication method that is based on a wireless LAN standard.

11. The communication apparatus according to claim 1, wherein the control unit performs control so as to share setting information for establishing communication with the external apparatus via the second communication unit, with the external apparatus via the first communication unit.

12. A control method executed by a communication apparatus comprising:
a first communication unit configured to communicate with an external apparatus in accordance with a first communication method; and
a second communication unit configured to communicate with the external apparatus in accordance with a second communication method, and
the control method comprising:
determining identification information of the second communication unit based on predetermined information related to communication with the external apparatus via the first communication unit; and
performing control so as to establish communication with the external apparatus via the second communication unit; using the determined identification information of the second communication unit,
wherein at least a portion of the identification information of the second communication unit is randomly determined in a case where the predetermined information satisfies a predetermined condition, and
wherein the identification information of the second communication unit is determined to be a specific value in a case where the predetermined information does not satisfy the predetermined condition.

13. A non-transitory computer-readable storage medium which stores a program for causing a computer of a communication apparatus to execute a control method, the communication apparatus comprising:
a first communication unit configured to communicate with an external apparatus in accordance with a first communication method; and
a second communication unit configured to communicate with the external apparatus in accordance with a second communication method, and
the control method comprising:
determining identification information of the second communication unit based on predetermined information related to communication with the external apparatus via the first communication unit; and
performing control so as to establish communication with the external apparatus via the second communication unit, using the determined identification information of the second communication unit,
wherein at least a portion of the identification information of the second communication unit is randomly determined in a case where the predetermined information satisfies a predetermined condition, and
wherein the identification information of the second communication unit is determined to be a specific value in a case where the predetermined information does not satisfy the predetermined condition.

* * * * *